(12) United States Patent
Doring et al.

(10) Patent No.: US 6,374,611 B2
(45) Date of Patent: Apr. 23, 2002

(54) EXHAUST TURBINE FOR A TURBOCHARGER

(75) Inventors: Volker Doring, Stuttgart; Hans-Dieter Hensel, Vaihingen; Peter Schick, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/877,711

(22) Filed: Jun. 8, 2001

(30) Foreign Application Priority Data

Jun. 9, 2000 (DE) .......................... 100 28 733

(51) Int. Cl.[7] .......................... F02B 33/44; F01B 25/02
(52) U.S. Cl. ........................ 60/605.1; 415/157; 415/158
(58) Field of Search ........................ 60/605.1; 415/157, 415/158, 159, 165

(56) References Cited

U.S. PATENT DOCUMENTS 5,025,629 A * 6/1991 Woollenweber .............. 60/600
5,214,920 A * 6/1993 Leavesley .................... 60/602
5,454,225 A * 10/1995 Sumser et al. ................ 60/602
5,927,943 A * 7/1999 Maier ......................... 415/167
6,220,031 B1 * 4/2001 Daudel et al. ................ 60/602

FOREIGN PATENT DOCUMENTS

DE      19645388 A1     5/1998
EP      0 589 174 A1    5/1994

* cited by examiner

Primary Examiner—Hoang Nguyen
(74) Attorney, Agent, or Firm—Klaus J. Bach

(57) ABSTRACT

In an exhaust turbine of a turbocharger with a rotor mounted rotatably in a turbine casing having a spiral inlet duct with a guide vane structure including guide vanes arranged around the rotor and extending essentially tangentially to an outer and inner imaginary circular surface areas in the inflow zone and, respectively, the outflow zone of the guide vane structure, at least the trailing edges but preferably also the leading edges of the guide vanes extend at an angle to an axial line of the imaginary circular surface areas, thereby providing for a uniform loading of the rotor.

4 Claims, 2 Drawing Sheets

EXHAUST TURBINE FOR A TURBOCHARGER

The invention relates to an exhaust turbine for a turbocharger including a turbine rotor which is rotatably supported in a turbine housing including a spiral inlet duct with a guide vane structure for guiding the exhaust gas onto the turbine rotor.

BACKGROUND OF THE INVENTION

Exhaust gas turbochargers are used both for compression-ignition reciprocating-piston internal combustion engines with quality control and for spark-ignition reciprocating-piston internal combustion engines with quality control or quantity control to boost the power output or improve the quality of the exhaust gas by using compressed air to improve cylinder charging and the utilization of the expansion energy of the combustion gases.

Exhaust turbochargers are well-proven auxiliary devices. They are of simple design and have a long life. They generally comprise an exhaust turbine with a fixed blade geometry that drives a radial compressor. While the exhaust turbine is a hydrodynamic machine which works well together with the radial compressor, both units combined as an exhaust gas turbocharger have an operating behavior, which is different from that of a reciprocating-piston internal combustion engine. The turbocharger behavior can be adapted only with difficulty to the requirements of the reciprocating-piston internal combustion engine. If the exhaust turbocharger is designed for the full-load range of the reciprocating-piston internal combustion engine, the delivery pressure in the low-speed range is inadequate because of a reduced mass flow of exhaust gas and reduced gas velocity through the exhaust turbine. If, on the other hand, the exhaust turbocharger is designed for the low-speed range of the reciprocating-piston internal combustion engine, the flow volume in the full-load range is too high, making it necessary to discharge an excessive quantity of exhaust gas via a bypass valve in order to avoid exceeding the desired boost pressure. This results in considerable losses of efficiency.

To mitigate the conflict of objects described above, exhaust turbochargers with variable blade geometry are used. EP 0 598 174 A1 describes an exhaust turbocharger for an internal combustion engine, the exhaust turbine of which has a rotor that is surrounded by a gas flow distributor with an at least partially diagonal gas flow through it and with a spiral inlet guide duct. The inlet guide duct includes an outlet zone in the form of an annular nozzle, in which a variable guide vane structure is arranged. When the internal combustion engine is at full load, the flow cross-section of the guide vane structure is completely open. During part load operation of the internal combustion engine, the guide vane structure is partially closed for reducing the flow cross-section by a rotating a part of the guide vane structure. These measures enable the speed of the exhaust gas turbine to be maintained at a high level also in the part-load range or even the low-speed range of the internal combustion engine, despite the reduced volume flow, and thus extend the effective operating range at the exhaust gas-turbine end of the exhaust turbocharger. When the internal combustion engine is being operated at full load, the throttling effect of the guide vane structure can be used as an engine brake.

DE 196 45 388 A1 discloses an exhaust turbine in which a guide vane structure is disposed axially in an annular space between a spiral inlet duct and a rotor. At its free end, the guide vane structure has a cover ring, which covers an annular gap between the turbine casing and an inner guide of the guide vane structure, when the guide vane structure is in a retracted position. This permits also a control of the inlet flow cross section with effects comparable to those described above.

The rotor of the exhaust gas turbine is highly stressed, especially in a braking mode. Upon rotation of the rotor, the rotor blades are subjected to pulses according to the number of guide vanes in the guide vane structure. As a result, the rotor blades and the rotor may be excited into vibration, which stresses the components and the mounting thereof.

It is the principal object of the invention to reduce the stresses to which the rotor blades, the rotor and the mounting thereof are subjected.

SUMMARY OF THE INVENTION

In an exhaust turbine of a turbocharger with a rotor mounted rotatably in a turbine casing having a spiral inlet duct with a guide vane structure including guide vanes arranged around the rotor and extending essentially tangentially to an outer and inner imaginary circular surface areas in the inflow zone and, respectively, the outflow zone of the guide vane structure, at least the trailing edges but preferably also the leading edges of the guide vanes extend at an angle to an axial line of the imaginary circular surface areas, thereby providing for a uniform loading of the rotor.

Since the front and particularly the trailing ends of the guide vanes are disposed at an angle with respect to an axial line, the pressure pulses of the exhaust gas are distributed to the rotor blades over an increased angular range, and the loading of the individual rotor blades is reduced as the rotor is acted upon in an almost uniform manner. It is furthermore possible to stagger the sequence of pulses by giving the guide vanes different lengths thus avoiding excitation either of the rotor blades or of the guide vanes in the resonant frequency range.

According to another refinement of the invention, the guide vanes are connected to one another by cover rings disposed at the axial ends of the vanes. These rings also ensure that an annular gap in the turbine casing is closed as much as possible by simple means and, furthermore, they stabilize the thin-walled guide vanes. Vibrations in the region of the guide vane structure are thereby avoided.

The invention will become more readily apparent from the following description of a preferred embodiment thereof described below on the basis of the accompanying drawings.

DESCRIPTION OF A PREFERRED EMBODIMENT

Figure 1:
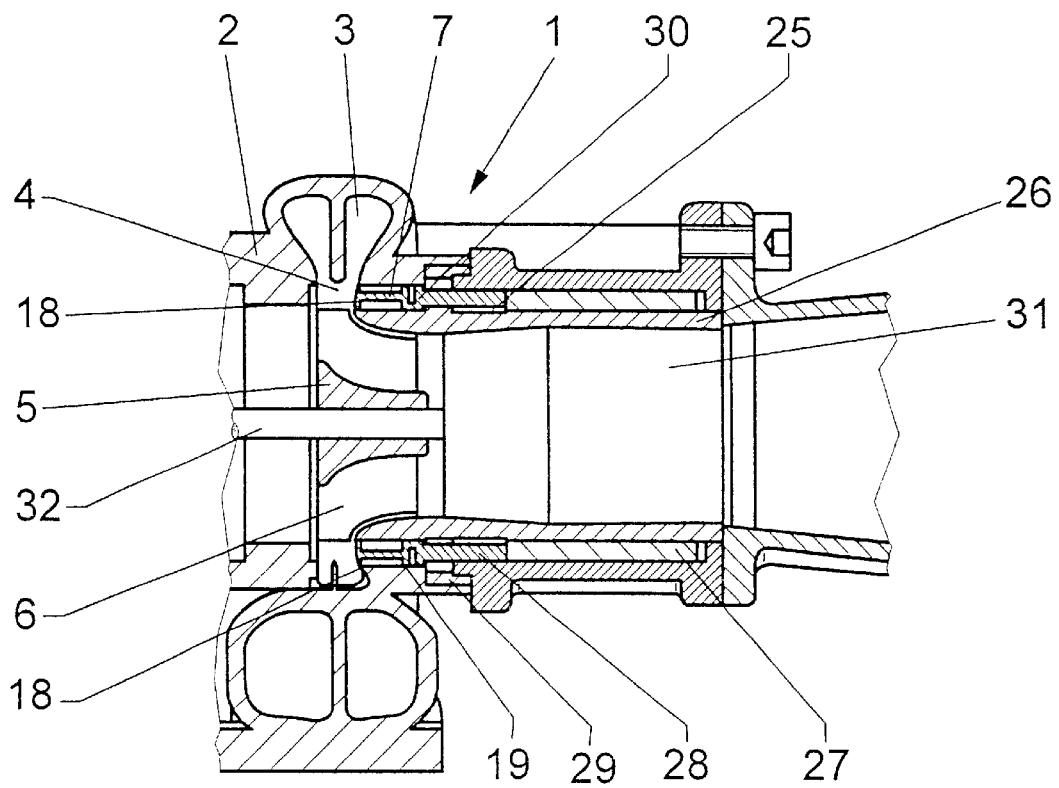
FIG. 1 shows a partial longitudinal section through a turbine casing of an exhaust turbine with a retracted guide vane structure.
Figure 2:
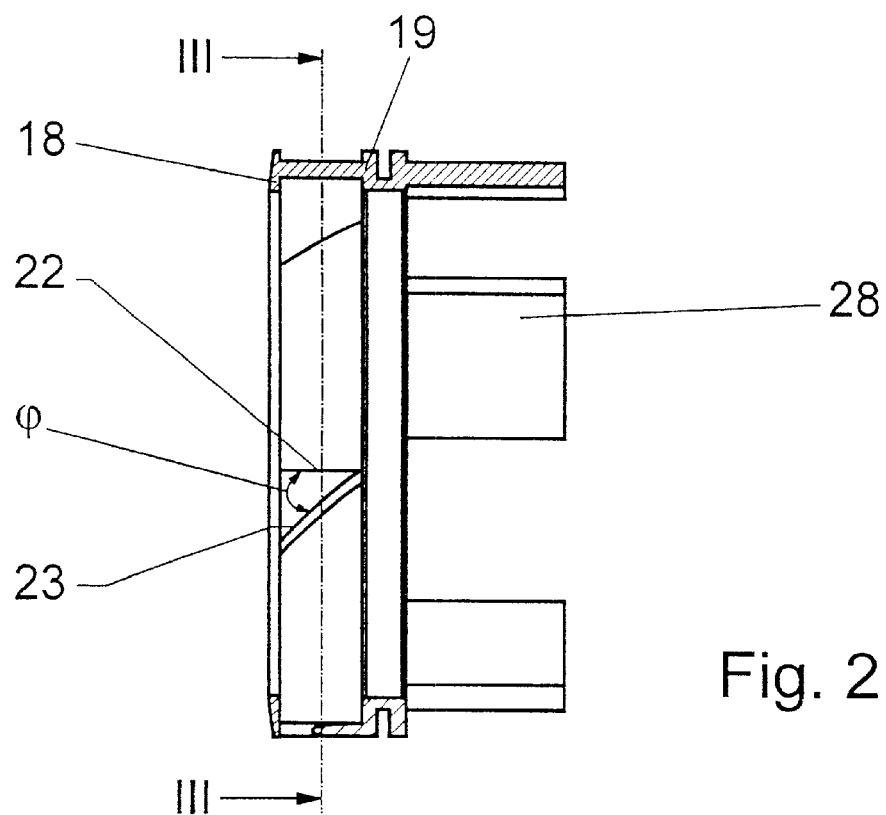
FIG. 2 shows in an axial cross-sectional view an axially slideable guide vane structure.

FIG. 1 shows an exhaust gas turbine with a casing including a dual-flow spiral inlet duct 3, which opens into an annular space 4. Adjoining this annular space 4 in the radial direction is a rotor 5 of the exhaust gas turbine 1, which is provided with rotor blades 6. Exhaust gases flow through the rotor 5 into an axially aligned outlet duct 31 and, in the process, drive the rotor 5, which is connected by a shaft 32 to an impeller (not shown specifically) of a radial compressor to form a turbocharger as it is well known in the art.

An annular axial slide 30, which carries a guide vane structure 7 with guide vanes 8 to 12, is provided in an annular gap 25 between the turbine casing 2 and an inner guide member 26. These guide vanes have different circumferential lengths 13 to 17 for preventing the occurrence of resonant vibration during operation. Cover rings 18 and 19 connect the axial ends of the guide vanes 8 to 12 to one another and stabilize the vanes. At the same time, the outer cover ring 18 covers the annular gap 25 when the axial slide 30 is retracted (FIG. 1) While the inner cover ring 19 covers the annular gap 25 in the operational position of the guide vane structure.

At the end of the axial slide 30 remote from the guide vane structure 7, there are slide lugs 28, by means of which the axial slide 30 is guided circumferentially in an axially displaceable manner in guide slots 29 of the inner guide member 26. A sliding sleeve 27, which engages the axial slide 30 in the annular space 4 or moves it out of the annular space 4 acts on the end of the slide lugs 28 (FIG. 1).

Figure 3:
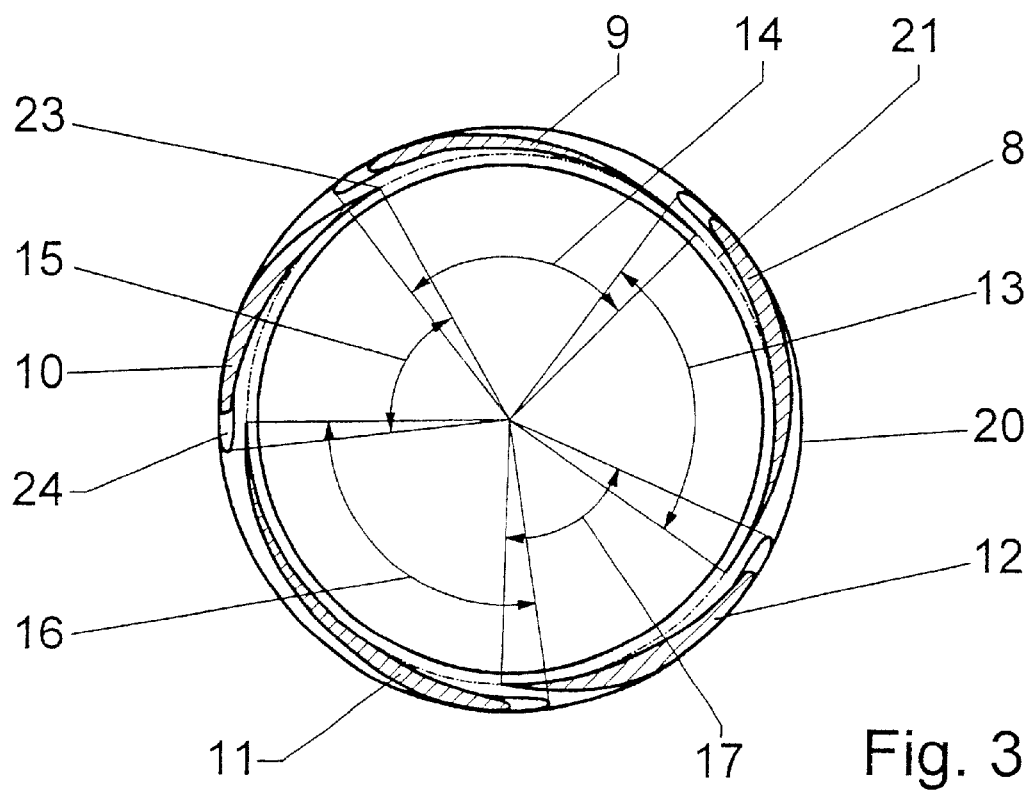
FIG. 3 is a cross-sectional view taken along line III—III of FIG. 2.

The guide vanes 8 to 12 extend essentially tangentially between an imaginary outer circular surface 20 and an imaginary inner circular surface 21 (FIG. 3). In the direction of the inlet duct 3, the guide vanes 8 to 12 have leading edges 24, while they have trailing edges 23 in the direction of the rotor 5. The trailing edges 23 and the leading edges 24 extend at an angle $\Phi$ with an axial line 22 on the inner circular surface 23 and the outer circular surface 20, with the result that the gap between the guide vanes 8 to 12 extends at an oblique angle to the axial line 22 and hence to the leading edges of the rotor blades 6 of the rotor 5. The shock loading on the rotor blades 6 is thereby greatly reduced and the rotor 5 is acted upon in an essentially uniform manner.

What is claimed is:

1. An exhaust turbine for a turbocharger comprising a turbine casing with a spiral inlet duct, a rotor mounted rotatably in said turbine casing, a guide vane structure with guide vanes arranged in said inlet duct so as to surround the rotor, said guide vanes extending essentially tangentially to an outer and an inner imaginary circular surface in an inflow area and an outflow area of said guide vane structure, said guide vanes having leading edges and trailing edges with at least said trailing edges extending at an angle to axial lines of said imaginary circular surfaces.

2. An exhaust turbine according to claim 1, wherein both, said trailing edges and said leading edges of said guide vanes extend at an angle to axial lines of the respective imaginary circular surfaces.

3. An exhaust turbine according to claim 1, wherein said guide vanes have different circumferential lengths.

4. An exhaust turbine according to claim 1, wherein said guide vanes are connected to one another by cover rings disposed at the axial ends of said guide vanes.

* * * * *